April 11, 1961     A. E. MARTIN     2,979,651
ALTERNATING CURRENT FREQUENCY CHANGING APPARATUS
Filed Jan. 29, 1957
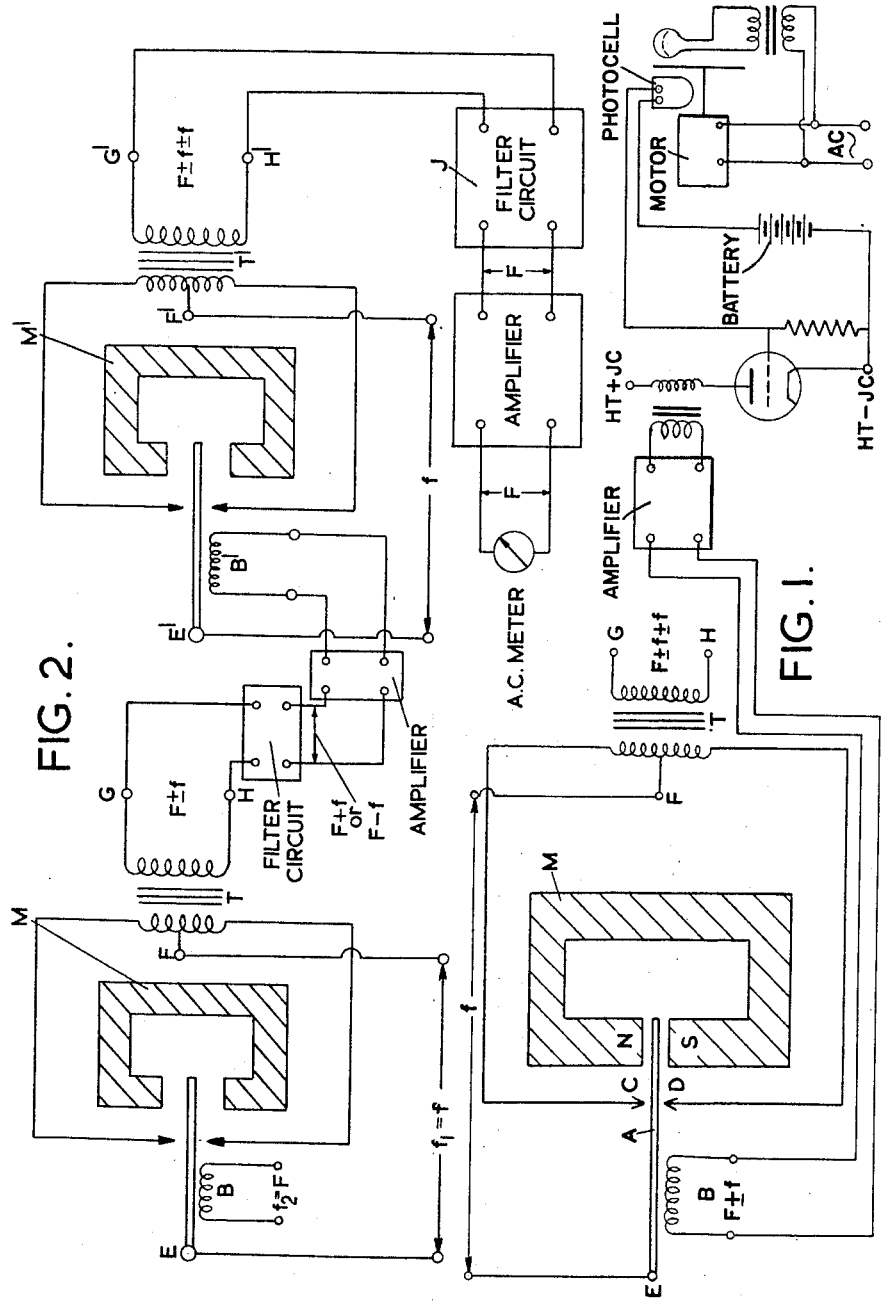

United States Patent Office 2,979,651
Patented Apr. 11, 1961

2,979,651

ALTERNATING CURRENT FREQUENCY CHANGING APPARATUS

Albert E. Martin, Newcastle-upon-Tyne, England, assignor to Sir Howard Grubb Parsons & Company Limited, Newcastle-upon-Tyne, England Filed Jan. 29, 1957, Ser. No. 636,998

Claims priority, application Great Britain Jan. 30, 1956

7 Claims. (Cl. 321—70)

This invention relates to means for converting alternating currents from a low to a higher frequency.

In many types of process-control instruments an A.C. signal at a low frequency of the order of 10 c./s., and proportional to a quantity to be measured, is frequently obtained and hitherto it has been necessary to convert this alternating current into D.C. for the purpose of indicating and recording the quantity being measured. Means for accomplishing this are well known to those versed in the art, but the ability to convert from the signal frequency to a higher value, say 50 c./s., would simplify the problem of smoothing the rectified current, or, alternatively, the unrectified current at 50 c./s. could be measured with any of several types of standard A.C. meter which are suitable for operation at 50 c./s. but not 10 c./s.

Frequently null-balance instruments are preferred to direct deflection types and then the problem is to use a low frequency out-of-balance signal to operate a self-balancing mechanism. Since servo systems operating at 10 c./s. are difficult to design, the usual method adopted is to rectify the low frequency signal and feed the rectified current to a standard self-balancing mechanism which operates from D.C.

It is the purpose of the present invention to provide means for converting a low frequency signal to (a) a higher frequency which can be measured directly with a standard A.C. meter or (b) to the same frequency as the A.C. mains (50 c./s. in the United Kingdom), so that a standard mains frequency operated servo-system can be employed to adjust the instrument continuously to null-balance.

The invention consists in means for raising the frequency ($f$) of an electrical signal to a higher frequency ($F \pm f$) which means comprise an arm fixed at one end and free to vibrate at the other between poles of a magnet, said arm being caused to vibrate by an energising coil supplied with alternating current at frequency (F) and constant amplitude, movement of said arm closing alternately two sets of contacts in a circuit which includes the primary winding of a transformer, said signal of frequency ($f$) being applied between a terminal on the vibrating arm and a terminal connected to a tapping point on the primary winding of said transformer, the output from the secondary winding of said transformer being applied to selection means for selecting a signal of frequency ($F \pm f$).

The invention also consists in means in accordance with the preceding paragraph in which the selection means comprise amplification means and a filter circuit.

The invention also consists in means for converting a low frequency signal ($f$) to a higher frequency signal (F) which means comprise two frequency conversion means as described in the first of the two preceding paragraphs namely a first converter and a second converter, the arrangement being that alternating currents of constant amplitude and frequencies $f_1$ and $f_2$ such that $f_1 \pm f_2 \pm f = F$, are produced independently of the signal whose frequency is to be increased and these constant amplitude currents are applied to the said first converter, one constant amplitude current being applied between the terminal on the vibrating arm and the terminal connected to a tapping point of the primary winding of the transformer whilst the other constant amplitude current is applied to the energising coil of said first converter, the output of said first converter having frequency components $f_1 \pm f_2$ one of which ($f_3$) is selected by suitable selection means and applied to the energising coil of said second converter, the signal of frequency ($f$) being applied between the terminal on the vibrating arm and the terminal connected to the tapping point of the primary winding of the transformer of said second converter and the output from the transformer secondary winding in said second converter having frequency components of $f_3 \pm f$ which are applied to suitable selection means whereby a signal of frequency F is isolated.

The invention also consists in means in accordance with the preceding paragraph in which the frequencies $f_1$ and $f_2$ are made equal to $f$ and F respectively.

The invention also consists in means in accordance with either of the two preceding paragraphs in which the output from the first converter is amplified before being applied to the second converter.

The invention also consists in means in accordance with the first of the three preceding paragraphs in which the first converter is replaced by A.C. generating means producing a current of frequency $F \pm f$ which current is applied to the energising coil of the said second converter.

The invention also consists in means in accordance with the preceding paragraph in which the A.C. generating means comprise a photo-cell receiving light from a suitable source, said light being interrupted a frequency constantly related to that of the signal, the output from the photo-cell being applied to the grid and cathode of an amplifying valve and an alternating current is taken from the anode circuit of the valve.

The invention also consists in means in accordance with any of the preceding seven paragraphs applied in an infra-red gas analyzer.

The invention also consists in means in accordance with any of the preceding eight paragraphs substantially as described with reference to Figure 1 and the modification as shown in Figure 2 of the accompanying drawing.

A vibrator of a well-known type is shown in Figure 1 of the accompanying drawings in which a vibratory member A is fixed at E and is caused to vibrate between two poles of a magnet M, at mains frequency (generally 50 c./s. in Great Britain) by applying a current from the mains to the energising coil B. The member A makes contact with C during one half-period of the applied A.C. and with contact D during the other half-period. If D.C. is applied between terminals E, F (F preferably being the centre point of the primary winding of a transformer T), A.C. at 50 c./s. appears across the terminals G, H of the transformer secondary. If, however, as is proposed in the present invention an input signal of low frequency ($f$) is applied to terminals E, F and the mains frequency is F, frequencies $F-f$ and $F+f$ appear across terminals G, H. One of these can be selected by a filter circuit of well-known type, and, after amplification if necessary, can be fed to a standard A.C. meter or otherwise utilised. By way of an example if F is 50 c./s. and $f$ is 10 c./s., frequencies of 40 and 60 c./s. will be obtained and either of these is in general sufficiently near to 50 c./s. to operate meters and other apapratus designed to operate at that frequency.

The mode of operation of the converter is made clear from the following argument:

Since the effect of the energising coil B and arm A is to reverse periodically the direction of the current through the primary winding of the transformer T, i.e. to multiply the signal applied to E, F by $\pm 1$, it can be represented by multiplying the signal, assumed equal to $e \sin \omega t$ (where $\omega = 2\pi f$) by a square-wave function, which by Fourier analysis can be represented as $$\frac{4}{\pi}\{\sin pt + \tfrac{1}{3}\sin 3pt + \tfrac{1}{5}\sin 5pt + \ldots\}$$

where $p = 2\pi f$.

It does not matter if the effect is not exactly equivalent to a square wave, since the only difference will be that the values given for the constants in the above expression are slightly different. Provided that the behaviour is similar for both halves of the driving A.C. wave, only odd harmonics will appear but if the operating is unsymmetrical even harmonics will also be produced. The most general form of the voltage appearing across G. H. when the signal voltage also contains harmonics will therefore be $(a_1 \sin \omega t + b_1 \sin 2\omega t + c_1 \sin 3\omega t + \ldots)$
$(a_2 \sin pt + b_2 \sin 2pt + c_2 \sin 3pt + \ldots)$ The only term of interest is $a_1 a_2 \sin \omega t \sin pt$ which is identical with $$\frac{a_1 a_2}{2} \cos(p-\omega)t - \cos(p+\omega)t$$

This is equivalent to the simultaneous production of two frequencies $F-f$ and $F+f$, either of which can be selected by means of a filter circuit. Higher terms are not of interest since the amplitude will in general be very small compared with the amplitude of frequencies $F-f$ and $F+f$.

In order to convert the input signal frequency from $f$ to $F$ (case $b$) two converters of the kind described above can be used for example as illustrated in Figure 2. In this case the arrangement is that two constant amplitude alternating currents of frequency $f_1$ and $f_2$ are supplied independently of the signal whose frequency is to be increased. The values of $f_1$ and $f_2$ being chose such that $f_1 \pm f_2 \pm f = F$. For convenience it will be assumed that $f_1 = f$ and $f_2 = F$.

The constant amplitude current of frequency $f$ is applied to terminals EF and the constant amplitude current of frequency $F$ is applied to energising coil B of the first converter and the output from terminals GH consequently contains frequency components $F \pm f$.

This output component of frequency $F \pm f$ is then applied across the energising coil B' of the second converter and the signal whose frequency is to be increased from $f$ to $F$ is applied across the terminals E' F' of the second converter. As a consequence the output from terminals G' H' of the second converter contains a frequency component $F \pm f \pm f$ and by a suitable filter circuit a signal of frequency F can be isolated.

The currents applied to the energizing coils have been described in the specification and claims as being of constant amplitude but it will be appreciated that small deviations from a constant value will be tolerable without affecting the working of the invention. The criterion is that the amplitude of the energising current should always be sufficient to ensure proper functioning of the vibrating arm A.

The output from the first converter may need amplification by known means in order to bring it to a level suitable for energising coil B of the second converter.

The constant amplitude current $f$ can be obtained by driving a small A.C. generator simultaneously with the means generating the signal whose frequency is to be increased. In the case where the final frequency is to be mains frequency then the current whose frequency is F is derived from the mains supply.

Alternatively the constant amplitude current of frequency $(f)$ can be produced by any known A.C. generating circuit. For example in the application of the invention to twin beam path infra-red gas analysers an A.C. generating circuit comprising a photo-cell can be employed.

Such gas analysers usually consist of a suitable source or sources of infra-red radiation, for example a heated Nichrome spiral, from which radiations are passed by way of two beam paths, one containing a gas to be analysed and the other path being a comparison path, before falling on detection means which produce an electric signal which is a function of the radiation absorbed by the sample gas. By interrupting the radiation in each beam path simultaneously at regular intervals an alternating signal is produced, a suitable form of beam interruption being a rotating sector.

In the generating circuit used the photo-cell receives light from a tungsten filament lamp the light beam from the filament being interrupted by a rotating sector similar to that in the instrument and driven in synchronism with it. If, therefore, the signal from the detector in the instrument is at frequency $f$ the output of the photo-cell will be at frequency $f$ and this output can be applied between grid and cathode of an amplifying valve and an alternating current at this frequency $f$ taken from the anode circuit of the valve in known manner.

In some cases it may be possible to derive a frequency $F \pm f$ directly in which case the first converter can be dispensed with.

If for example the signal frequency $(f)$ was 10 cycles per second and it was required to convert this to a signal of frequency (F) 50 cycles per second then an A.C. generator could be driven simultaneously with the rotating sector in the instrument and design so as to produce an alternating current of frequency $(F-f)$ of 40 cycles per second.

This alternating current would then be used to energise coil B in the second converter whilst the signal from the instrument is applied across terminals EF. The output from the converter would then be $40 \pm 10$ from which an output of 50 cycles per second can be derived.

Alternatively the current of frequency $(f)$ 10 cycles per second could first be derived by any of the means previously described and this current applied to a circuit such as described in the co-pending British application No. 23,220/55 in which a valve circuit produces a wave form rich in harmonics and from this by selecting the fourth harmonic a current of frequency $(F-f)$ 40 cycles per second could be selected.

If the instrument in which the invention is to be used is a null balance type of instrument in which the resulting signal is to be used to drive a two phase motor then the alternating current used in the converter or converters must have the same phase as the signal from the instrument. In normal circumstances this will automatically be the case as both instrument and alternating current generating means will be fed from the mains supply.

What is claimed is:

1. Means for raising the frequency $(f)$ of an electrical signal to a higher frequency $(F \pm f)$ which means comprise an arm fixed at one end and free to vibrate at the other between poles of a magnet, said arm being caused to vibrate by an energising coil supplied with alternating current at frequency (F) and constant amplitude, movement of said arm closing alternately two sets of contacts in a circuit which includes the primary winding of a transformer, said signal of frequency $(f)$ being applied between a terminal on the vibrating arm and a terminal connected to a tapping point on the primary winding of said transformer, the output from the secondary winding of said transformer being applied to selection means for selecting a signal of frequency $F \pm f$.

2. Means for raising the frequency of an electrical signal to a higher frequency as claimed in claim 1, in which the selection means comprise amplification means and a filter circuit.

3. Means for converting a low frequency signal ($f$) to a higher frequency signal ($F$) which means comprise two frequency conversion means as described in claim 1 namely a first converter and a second converter, the arrangement being that alternating currents of constant amplitude and frequencies $f_1$ and $f_2$ such that $$f_1 \pm f_2 \pm f = F$$

are supplied independently of the signal whose frequency is to be increased and these constant amplitude currents are applied to the said first converter, one constant amplitude current being applied between the terminal on the vibrating arm and the terminal connected to a tapping point of the primary winding of the transformer whilst the other constant amplitude current is applied to the energizing coil of said first converter, the output of said first converter having frequency components $f_1 \pm f_2$ one of which ($f_3$) is selected by suitable selection means and applied to the energising coil of said second converter, the signal of frequency ($f$) being applied between the terminal on the vibrating arm and the terminal connected to the tapping point of the primary winding of the transformer of said second converter and the output from the transformer secondary winding in said second converter having frequency components of $f_3 \pm f$ which are applied to suitable selection means whereby a signal of frequency F is isolated.

4. Means for converting a low frequency signal ($f$) to a higher frequency signal (F), as claimed in claim 3, in which the frequencies $f_1$ and $f_2$ are made equal to $f$ and F respectively.

5. Means for converting a low frequency signal ($f$) to a higher frequency signal (F), as claimed in claim 3, in which the output from the first converter is amplified before being applied to the second converter.

6. Means for converting a low frequency signal ($f$) into a higher frequency signal (F) which means comprise an arm fixed at one end and free to vibrate at the other between poles of a magnet, said arm being caused to vibrate by an energising coil supplied with a signal of frequency $F \pm f$ and constant amplitude produced by A.C. generating means, movement of said arm closing alternately two sets of contacts in a circuit which includes the primary winding of a transformer, said signal of frequency $f$ being applied between a terminal on the vibrating arm and a terminal connected to a tapping point on the primary winding of said transformer, the output from the transformer secondary winding having frequency components ($F \pm f \pm f$) said output being applied to selection means whereby a signal of frequency F is selected.

7. Means as claimed in claim 6, in which the A.C. generating means comprise a photo-cell receiving light from a suitable source, said light being interrupted at a frequency constantly related to that of the signal, the output from the photo-cell being applied to the grid and cathode of an amplifying valve and an alternating current being taken from the anode circuit of the valve.

References Cited in the file of this patent

UNITED STATES PATENTS 1,871,904   Niles et al. _____ Aug. 16, 1932